(12) United States Patent
Okuda et al.

(10) Patent No.: US 9,891,514 B2
(45) Date of Patent: Feb. 13, 2018

(54) LIGHT SOURCE APPARATUS AND PROJECTION DISPLAY APPARATUS

(71) Applicant: Panasonic Intellectual Property Management Co., Ltd., Osaka (JP)

(72) Inventors: Michihiro Okuda, Osaka (JP); Hiroshi Kitano, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/008,197

(22) Filed: Jan. 27, 2016

(65) Prior Publication Data
US 2016/0223895 A1 Aug. 4, 2016

(30) Foreign Application Priority Data

Jan. 30, 2015 (JP) .................................. 2015-016837
Dec. 25, 2015 (JP) .................................. 2015-253862

(51) Int. Cl.
*G02B 27/18* (2006.01)
*G03B 21/20* (2006.01)

(52) U.S. Cl.
CPC ..... *G03B 21/2066* (2013.01); *G03B 21/2033* (2013.01)

(58) Field of Classification Search
CPC .................. G03B 21/2066; G03B 21/2033
See application file for complete search history.

(56) References Cited

U.S. PATENT DOCUMENTS

| 2003/0128917 | A1* | 7/2003 | Turpin | G02B 6/2861 |
| | | | | 385/24 |
| 2004/0257664 | A1 | 12/2004 | Hashimoto et al. | |
| 2010/0150186 | A1* | 6/2010 | Mizuuchi | H01S 3/09415 |
| | | | | 372/21 |
| 2016/0223892 | A1* | 8/2016 | Takahashi | F21V 9/16 |

FOREIGN PATENT DOCUMENTS

| JP | 2004-045684 A | 2/2004 |
| JP | 2011-203430 A | 10/2011 |
| JP | 2012-037724 A | 2/2012 |
| JP | 2013-061525 A | 4/2013 |

* cited by examiner

*Primary Examiner* — Y M Lee
(74) *Attorney, Agent, or Firm* — McDermott Will & Emery LLP

(57) ABSTRACT

A light source apparatus and a projection display apparatus according to the present disclosure include: a laser light source; and a multiplexing reflection mirror having a first surface on which a partial reflection coating having a predetermined reflectance is formed, and a second surface on which a total reflection coating is formed, the first surface and the second surface being opposite to each other and formed in a parallel flat shape. The multiplexing reflection mirror is disposed so as to incline toward an optical path of an emission light from the laser light source such that the emission light is incident from first surface.

7 Claims, 10 Drawing Sheets

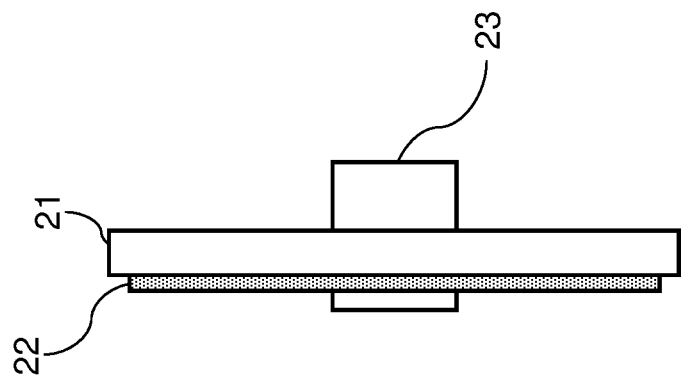
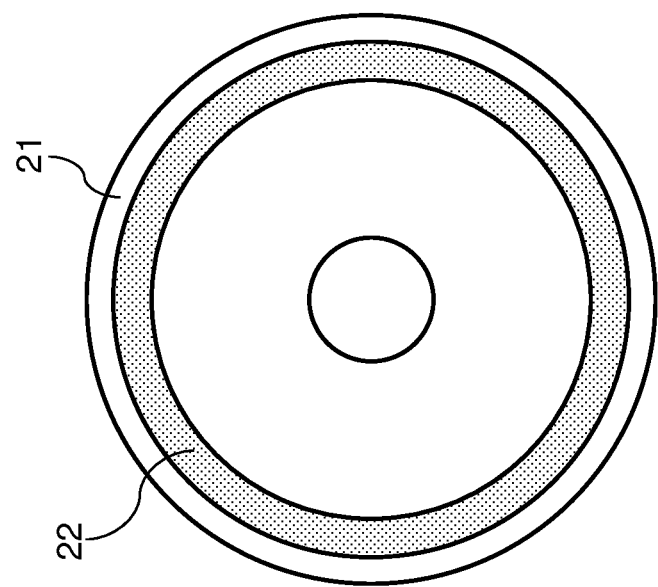

FIG. 9

| Reflectance of partial reflection film | 10% | 15% | 20% | 25% | 30% | 35% | 40% | 45% | 50% | 55% | 60% |
|---|---|---|---|---|---|---|---|---|---|---|---|
| Light intensity $I_1$ of 1st degree | 10.0% | 15.0% | 20.0% | 25.0% | 30.0% | 35.0% | 40.0% | 45.0% | 50.0% | 55.0% | 60.0% |
| Light intensity $I_2$ of 2nd degree | 81.0% | 72.3% | 64.0% | 56.3% | 49.0% | 42.3% | 36.0% | 30.3% | 25.0% | 20.3% | 16.0% |
| Light intensity $I_3$ of 3rd degree | 8.1% | 10.8% | 12.8% | 14.1% | 14.7% | 14.8% | 14.4% | 13.6% | 12.5% | 11.1% | 9.6% |
| Light intensity $I_4$ of 4th degree | 0.8% | 1.6% | 2.6% | 3.5% | 4.4% | 5.2% | 5.8% | 6.1% | 6.3% | 6.1% | 5.8% |
| Light intensity $I_5$ of 5th degree | 0.1% | 0.2% | 0.5% | 0.9% | 1.3% | 1.8% | 2.3% | 2.8% | 3.1% | 3.4% | 3.5% |
| Light intensity $I_{6-\infty}$ of 6th and subsequent degree | 0.0% | 0.0% | 0.1% | 0.3% | 0.6% | 1.0% | 1.5% | 2.3% | 3.1% | 4.1% | 5.2% |

US 9,891,514 B2

LIGHT SOURCE APPARATUS AND PROJECTION DISPLAY APPARATUS

RELATED APPLICATIONS

This application is based upon and claims the benefit of priority to Japanese Patent Application No. 2015-016837, filed on Jan. 30, 2015, and Japanese Patent Application No. 2015-253862, filed on Dec. 25, 2015, which are incorporated herein by reference in their entirety.

BACKGROUND

1. Technical Field

The present disclosure relates to a light source apparatus which uses laser light sources, and a projection display apparatus which uses the light source apparatus.

2. Description of the Related Art

PTL 1 discloses a projector which can reduce unevenness in brightness and speckle noise of a projected video image by irradiating a rotation wheel of a circular substrate shapes on which a diffusing layer such as a diffuser is disposed, with lights emitted from a laser element.

CITATION LIST

Patent Literature

PTL 1: Unexamined Japanese Patent Publication No. 2013-61525

SUMMARY

An object of the present disclosure is to provide a light source apparatus and a projection display apparatus which can suppress unevenness in brightness and speckle noise of a projected video image while employing a simple configuration even when laser light sources are used.

A light source apparatus and a projection display apparatus according to the present disclosure include: a laser light source; and a multiplexing reflection mirror having a first surface on which a partial reflection coating having a predetermined reflectance is formed, and a second surface on which a total reflection coating is formed, the first surface and the second surface being opposite to each other and formed in a parallel flat shape. The multiplexing reflection mirror is disposed so as to incline toward an optical path of an emission light from the laser light source such that the emission light is incident from first surface.

According to the present disclosure, it is possible to provide a light source apparatus and a projection display apparatus which can suppress unevenness in brightness and speckle noise of a projected video image while employing a simple configuration even when laser light sources are used.

BRIEF DESCRIPTION OF DRAWINGS

FIG. 2A is a plan view illustrating a phosphor wheel according to the first exemplary embodiment;

FIG. 2B is a side view of the phosphor wheel illustrated in FIG. 2A;

FIG. 9 is a view illustrating a relationship between a reflectance of a partial reflection coating and a light intensity of each light flux of the multiplexing reflection mirror according to the first exemplary embodiment.

DETAILED DESCRIPTION OF THE PREFERRED EMBODIMENT

Exemplary embodiments will be described in detail below optionally with reference to the drawings. In this regard, the exemplary embodiments will not be described in detail more than necessary. For example, matters which have already been well known or substantially the same components will not be described again in some cases. This is to prevent the following description from unnecessarily becoming redundant, and help one of ordinary skill in the art understand the exemplary embodiments.

In addition, the accompanying drawings and the following description are provided to help one of ordinary skill in the art sufficiently understand the present disclosure, and do not intend to limit a subject matter recited in the claims.

First Exemplary Embodiment (Projection Display Apparatus)

Figure 1:
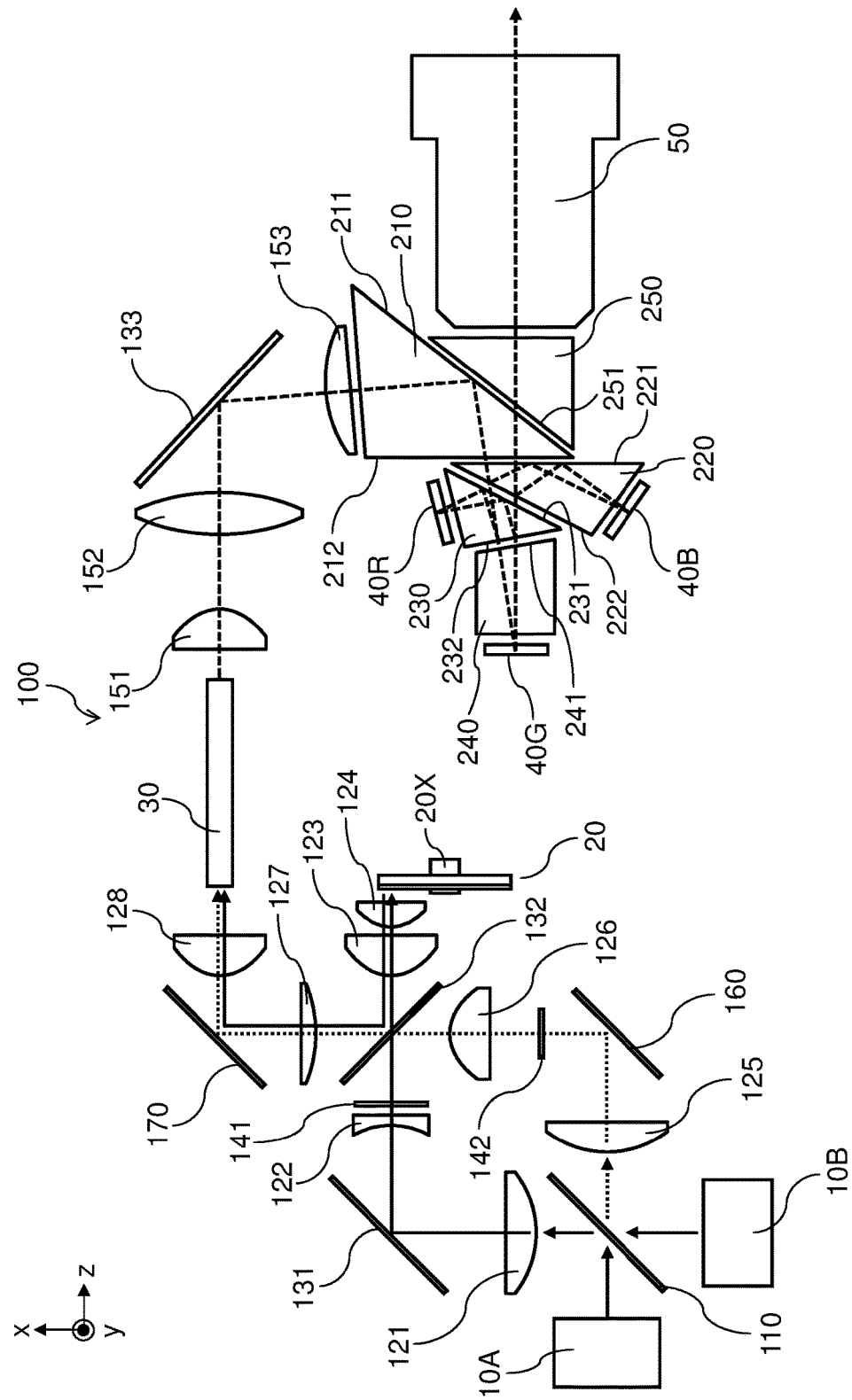
FIG. 1 is a view illustrating a projection display apparatus according to a first exemplary embodiment.

A configuration of a projection display apparatus according to the first exemplary embodiment will be described below with reference to FIGS. 1, 2A and 2B. FIG. 1 is a view illustrating projection display apparatus 100 according to the first exemplary embodiment.

As illustrated in FIG. 1, firstly, projection display apparatus 100 includes first light source unit 10A, second light source unit 10B, phosphor wheel 20, rod integrator 30, DMD (Digital Micromirror Device) including DMD 40R, DMD 40G and DMD 40B, and projection unit 50.

First light source unit 10A and second light source unit 10B include a plurality of solid state light sources such as laser diodes (LDs) and light emitting diodes (LED). In the present exemplary embodiment, for each solid state light source, a laser diode such as a laser diode which emits a blue light in particular is used. In this regard, each laser diode is a laser light source and an example of a light emitting element.

Emission lights from first light source unit 10A and second light source unit 10B are blue lights of wavelengths between 440 nm to 470 nm, and these blue lights are used as excitation lights for exciting a phosphor. In addition, first light source unit 10A and second light source unit 10B will be described in detail below (see FIGS. 4A and 4B).

Phosphor wheel 20 is configured to rotate about rotation shaft 20X elongated along an optical axis of an excitation light. Phosphor wheel 20 is a reflection phosphor wheel which emits an emission light in a direction opposite to an incident direction of an excitation light.

In more detail, as illustrated in FIGS. 2A and 2B, phosphor wheel 20 includes substrate 21, phosphor 22 which is annularly applied and formed on substrate 21 and in a rotation direction of substrate 21, and motor 23 which rotates substrate 21 on which phosphor 22 is formed. In addition, a reflection surface is formed by forming a reflection coating on a surface of substrate 21, and phosphor 22 is formed on this reflection surface. Phosphor 22 emits an emission light in response to excitation lights emitted from first light source unit 10A and second light source unit 10B. Lights emitted toward the reflection surface among yellow lights which are emission lights of phosphor 22 are reflected by the reflection surface. Phosphor 22 is an example of a light emitting body, and the phosphor wheel is an example of a wheel.

Phosphor 22 is a phosphor which emits fluorescent lights whose wavelength bands are mainly green to yellow. This phosphor 22 is preferably a phosphor which efficiently absorbs blue excitation lights, efficiently emits fluorescent lights and has robustness against temperature quenching. Phosphor 22 is, for example, Y3Al5O12: Ce3+ which is a cerium-activated garnet structure phosphor.

Rod integrator 30 is a solid rod made of a transparent material such as glass. Rod integrator 30 makes lights emitted from light source unit 10 uniform. In addition, rod integrator 30 may be a hollow rod whose inner wall is a mirror surface.

DMD 40 modulates lights emitted from first light source unit 10A, second light source unit 10B and phosphor wheel 20. In more detail, DMD 40 includes a plurality of micromirrors, and a plurality of micromirrors is movable. Each micromirror basically corresponds to one pixel. DMD 40 switches whether or not to reflect a light toward projection unit 50 by changing an angle of each micromirror.

In the first exemplary embodiment, as DMD 40, DMD 40R, DMD 40G and DMD 40B are provided. DMD 40R modulates red component light R based on red video signal R. DMD 40G modulates green component light G based on green video signal G. DMD 40B modulates blue component light B based on blue video signal B.

Projection unit 50 projects an image light modulated by DMD 40, on a projection surface.

Secondly, projection display apparatus 100 includes split/combining mirror 110. Split/combining mirror 110 is a mirror which combines emission lights from first light source unit 10A and second light source unit 10B, and splits part of emission lights. In addition, split/combining mirror 110 is an example of a split/combining optical element, and will not be described in detail below (see FIG. 5).

Further, projection display apparatus 100 includes a necessary mirror group. As the mirror group, mirror 131 to mirror 133 and mirror 170 are provided. Mirror 131, mirror 133 and mirror 170 are mirrors which bend optical paths. Dichroic mirror 132 is a dichroic mirror which has characteristics for allowing transmission of blue lights and reflecting yellow lights, and is an example of a combining optical element.

Further, projection display apparatus 100 includes multiplexing reflection mirror 160. Multiplexing reflection mirror 160 is a mirror which splits each light flux into a plurality of light fluxes on an optical path in which emission lights from first light source unit 10A are split by split/combining mirror 110, and which reflects the light fluxes. In addition, multiplexing reflection mirror 160 will be described in detail (see FIGS. 7 and 8).

Further, projection display apparatus 100 includes a necessary lens group. As the lens group, lens 121 to lens 128 and lens 151 to lens 153 are provided. Lens 121 is a condenser lens which condenses emission lights from first light source unit 10A and second light source unit 10B. Lens 122 is a convex lens which converts lights condensed by lens 121 into parallel lights. Lens 123 and lens 124 are condenser lenses which condense excitation lights on the phosphor of the phosphor wheel, and convert lights emitted from the phosphor, into parallel lights. Lens 125 is a condenser lens which condenses emission lights from first light source unit 10A and second light source unit 10B. Lens 126 is a condenser lens which is disposed at a downstream of a light condensing point of lights by lens 125, and converts the condensed lights into parallel lights again. Lens 127 and lens 128 are relay lenses which guide, to rod integrator 30, emission lights from first light source unit 10A and second light source unit 10B, and an emission light from the phosphor wheel. Lens 151, lens 152 and lens 153 are relay lenses which nearly form emission lights from rod integrator 30, on each DMD 40.

Further, projection display apparatus 100 includes a necessary diffuser group. As the diffuser group, diffuser 141 and diffuser 142 are provided. Diffuser 141 is a diffuser which diffuses lights incident as nearly parallel lights. Diffuser 142 is a diffuser which is disposed near a light condensing point of light fluxes of lens 125 and diffuses the light fluxes. Diffuser 141 and diffuser 142 are configured such that, for example, micro irregularities are formed on a surface of a glass substrate. Further, the micro irregular surface may be formed on a single surface or double surfaces.

In addition, a shape of each lens is adjusted such that light emission points of emission lights from phosphor wheel 20 and an incident surface of rod integrator 30 are nearly conjugate and diffuser 142 and the incident surface of rod integrator 30 are nearly conjugate.

Thirdly, projection display apparatus 100 includes a necessary prism group. As the prism group, prism 210, prism 220, prism 230, prism 240 and prism 250 are provided.

Prism 210 is made of a transparent material, and includes surface 211 and surface 212. An air gap is provided between prism 210 (surface 211) and prism 250 (surface 251). An angle (incident angle) at which a light incident on prism 210 is incident on surface 211 is larger than a total reflection angle, and therefore the light incident on prism 210 is reflected by surface 211. Meanwhile, an air gap is provided between prism 210 (surface 212) and prism 220 (surface 221). However, an angle (incident angle) at which the light reflected by surface 211 is incident on surface 212 is smaller than the total reflection angle, and therefore the light reflected by surface 211 transmits through surface 212.

Prism 220 is made of a transparent material, and includes surface 221 and surface 222. Surface 222 is a dichroic mirror surface which allows red component light R and green component light G to transmit, and reflects blue component light B. Hence, red component light R and green component light G among lights reflected by surface 211 transmit through surface 222, and blue component light B is reflected by surface 222. Blue component light B reflected by surface 222 is reflected by surface 221, and is incident on DMD 40B. In addition, red component light R emitted from DMD 40R and green component light G emitted from DMD 40G transmit through surface 222 and surface 221.

An air gap is provided between prism 210 (surface 212) and prism 220 (surface 221). Angles (incident angles) at which blue component light B first emitted from surface 222 and blue component light B emitted from DMD 40B are incident on surface 221 are larger than the total reflection angle, and therefore blue component light B first reflected by surface 222 and blue component light B emitted from DMD 40B are reflected by surface 221. Meanwhile, an angle (incident angle) at which blue component light B reflected by surface 221 and then reflected at a second time by surface 222 is incident on surface 221 is smaller than the total reflection angle, and therefore blue component light B reflected by surface 221 and then reflected at the second time by surface 222 transmits through surface 221.

Prism 230 is made of a transparent material, and includes surface 231 and surface 232. Surface 232 is a dichroic mirror surface which allows green component light G to transmit, and reflects red component light R. Hence, green component light G among lights reflected by surface 231 transmit through surface 232, and red component light R is reflected by surface 232. Red component light R reflected by surface 232 is reflected by surface 231, and is incident on DMD 40R. In addition, green component light G emitted from DMD 40G transmits through surface 232 and surface 231.

An air gap is provided between prism 220 (surface 222) and prism 230 (surface 231). Angles (incident angles) at which red component light R transmitting through surface 231 and reflected by surface 232 and red component light R emitted from DMD 40R is incident on surface 231 are incident on surface 221 again are larger than the total reflection angle, and therefore red component light R transmitting through surface 231 and reflected by surface 232 and red component light R emitted from DMD 40R are reflected by surface 231. Meanwhile, an angle (incident angle) at which red component light R emitted from DMD 40R, reflected by surface 231 and then reflected by surface 232 is incident on surface 231 is smaller than the total reflection angle, and therefore red component light R emitted from DMD 40R, reflected by surface 231 and then reflected by surface 232 transmits through surface 231.

Prism 240 is made of a transparent material, and includes surface 241. Surface 241 is configured to allow green component light G to transmit. In addition, green component light G incident on DMD 40G and green component light G emitted from DMD 40G transmit through surface 241.

Prism 250 is made of a transparent material, and includes surface 251.

In other words, blue component light B (1) is reflected by surface 211, (2) transmits through surface 212 and surface 221, then is reflected by surface 222, (3) is reflected by surface 221, (4) is reflected by DMD 40B, (5) is reflected by surface 221, (6) is reflected by surface 222 and (7) transmits through surface 221, surface 212, surface 211 and surface 251. Thus, blue component light B is modulated by DMD 40B and is guided by projection unit 50.

Red component light R (1) is reflected by surface 211, (2) transmits through surface 212, surface 221, surface 222 and surface 231, then is reflected by surface 232, (3) is reflected by surface 231, (4) is reflected by DMD 40R, (5) is reflected by surface 231, (6) is reflected by surface 232 and (7) transmits through surface 231, surface 232, surface 221, surface 212, surface 211 and surface 251. Thus, red component light R is modulated by DMD 40R and is guided to projection unit 50.

Green component light G (1) is reflected by surface 211, (2) transmits through surface 212, surface 221, surface 222, surface 231, surface 232 and surface 241, then is reflected by DMD 40G, and (3) transmits through surface 241, surface 232, surface 231, surface 222, surface 221, surface 212, surface 211 and surface 251. Thus, green component light G is modulated by DMD 40G and is guided to projection unit 50.

(Light Source Apparatus)

Figure 3:
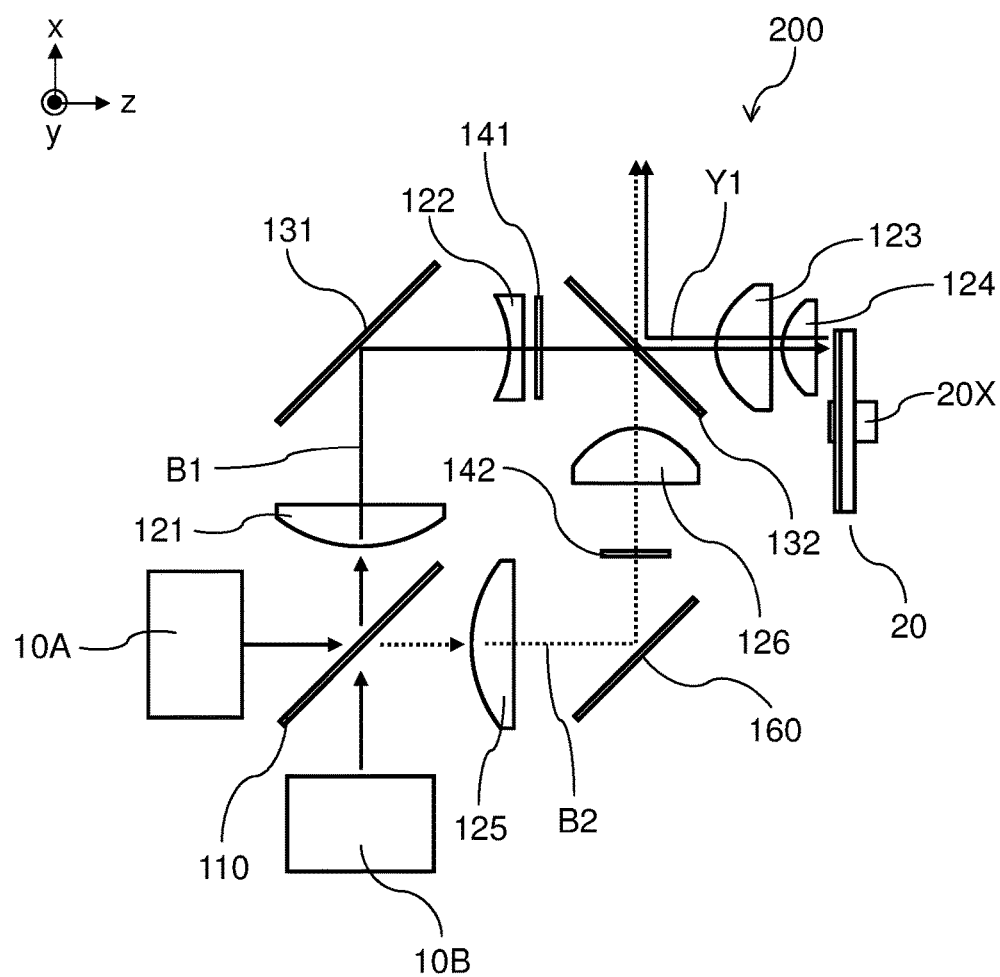
FIG. 3 is a view illustrating a light source apparatus according to the first exemplary embodiment.

The light source apparatus according to the first exemplary embodiment will be described below with reference to FIGS. 3 to 6. FIG. 3 is a view illustrating light source apparatus 200 according to the first exemplary embodiment.

Light source apparatus 200 used in projection display apparatus 100 illustrated in FIG. 1 mainly includes first light source unit 10A, second light source unit 10B, split/combining mirror 110 and phosphor wheel 20. Further, light source apparatus 200 includes the necessary lens group and mirror group. These components and description of the components are the same as contents described with reference to projection display apparatus 100, and therefore will not be described again.

Figure 4A:
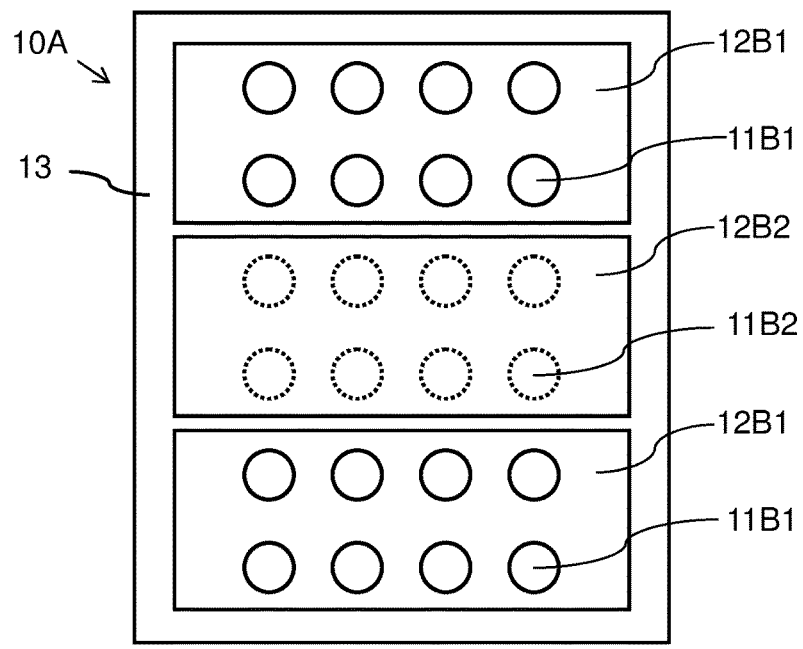
FIG. 4A is a view illustrating a first light source unit according to the first exemplary embodiment.
Figure 4B:
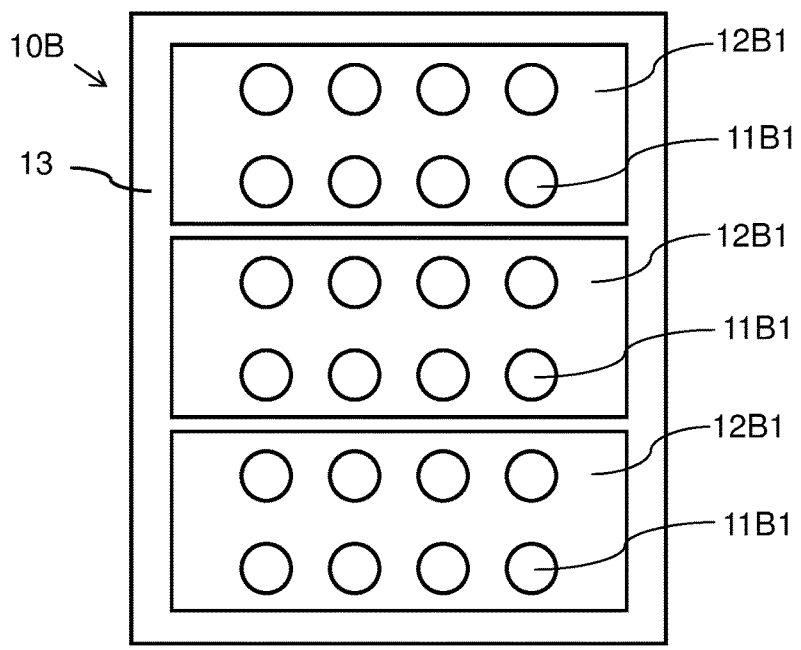
FIG. 4B is a view illustrating a second light source unit according to the first exemplary embodiment.

FIG. 4A is a view illustrating first light source unit 10A from a −z direction in FIG. 1. FIG. 4B is a view illustrating second light source unit 10B from a −x direction in FIG. 1.

First light source unit 10A includes light source blocks 12B1 and 12B2 which respectively include pluralities of laser diodes 11B1 and 11B2 which emit blue lights, and heat sink 13. Second light source unit 10B includes light source block 12B1 which includes a plurality of laser diodes 11B1 which emits blue lights, and heat sink 13. Laser diodes 11B1 and 11B2 will be collectively referred to as laser diode 11, and light source blocks 12B1 and 12B2 will be collectively referred to as light source block 12.

First light source unit 10A includes three light source blocks 12, and light source blocks 12B1 are disposed at an upper portion and a lower portion and light source block 12B2 is disposed at a center portion. Meanwhile, second light source unit 10B includes three same light source blocks 12B1.

Light source blocks 12B1 at the upper portion and the lower portion of first light source unit 10A, three light source blocks 12B1 of second light source unit 10B and light source block 12B2 at the center portion of first light source unit 10A will be assigned different reference numerals for ease of description. Further, laser diodes 11B2 are indicated by broken lines, and laser diodes 11B1 and laser diodes 11B2 which are assigned different reference numerals in the first exemplary embodiment for ease of description but have the same characteristics (wavelengths are 455 nm).

Light source block 12B1 employs a configuration where eight laser diodes 11B1 in total including four in a horizontal direction and two in a vertical direction are arranged. Light source block 12B2 employs a configuration where eight laser diodes 11B2 in total including four in the horizontal direction and two in the vertical direction are arranged.

Laser diode 11 is integrated with a collimate lens which converts an emission light into a parallel light, and laser diode 11 emits a nearly parallel light.

Heat sink 13 is made to adhere to a back surface of a light source block via, for example, a thermally conductive grease.

Figure 5:
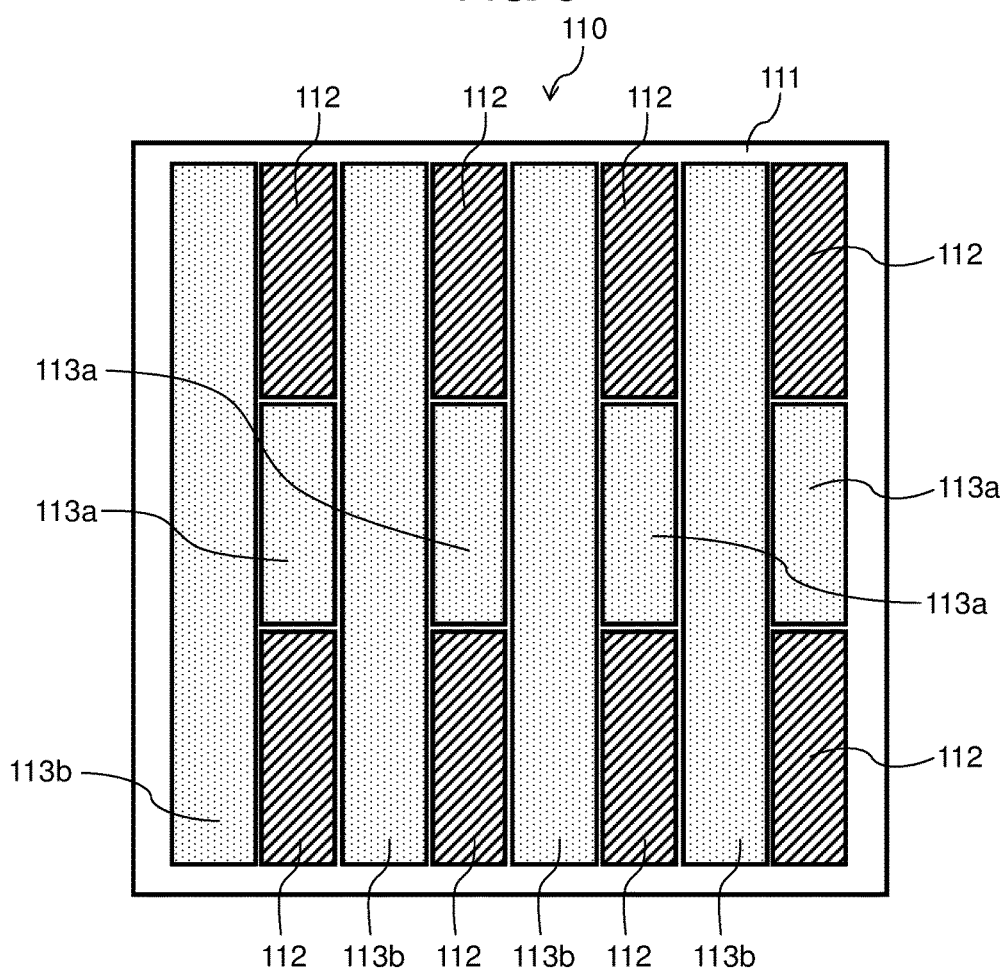
FIG. 5 is a view illustrating a split/combining mirror according to the first exemplary embodiment.

As illustrated in FIG. 5, split/combining mirror 110 is configured such that reflection areas 112 (hatching portions) and transmissive areas 113a and 113b (shaded portions) are formed on substrate 111. Substrate 111 is, for example, a glass substrate. On each reflection area 112, a reflection coating which reflects emission lights from first light source unit 10A and second light source unit 10B is formed. On transmissive areas 113a and 113b, AR (Anti-Reflection) coating which allow emission lights from first light source unit 10A and second light source unit 10B to transmit are formed. In addition, it is desirable to form an AR (Anti-Reflection) coating likewise on a back surface of substrate 111, too.

In this regard, a splitting and combining operation of split/combining mirror 110 will be described with reference to FIG. 6.

Figure 6:
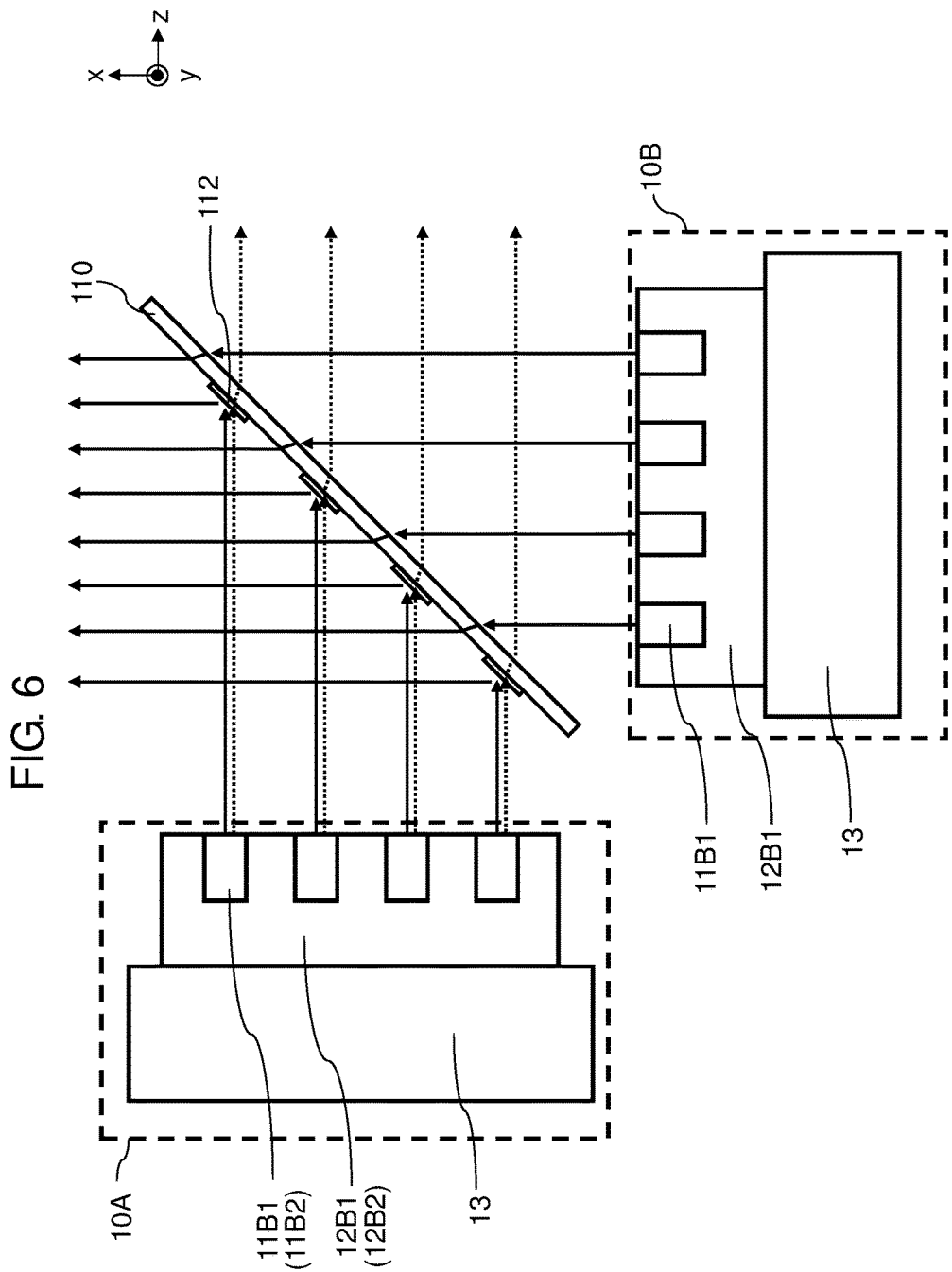
FIG. 6 is a view illustrating split and combining of light fluxes according to the first exemplary embodiment.

As illustrated in FIG. 6, first light source unit 10A emits blue lights in the z direction (first direction), and second light source unit 10B emits blue lights in the x direction (second direction). Thus, first light source unit 10A and second light source unit 10B are disposed such that respective emission directions, i.e., the first direction intersects with the second direction at 90°. Split/combining mirror 110 is disposed so as to incline toward the emission direction of the blue lights from first light source unit 10A and second light source unit 10B in this intersection area.

Emission lights from laser diodes 11B1 included in light source block 12B1 among the emission lights from first light source unit 10A are reflected at reflection areas 112 of split/combining mirror 110.

Meanwhile, emission lights (indicated by broken line arrows) from laser diodes 11B2 included in light source block 12B2 among the emission lights from first light source unit 10A transmit through transmissive areas 113a of split/combining mirror 110 (not illustrated in FIG. 6).

All emission lights from second light source unit 10B are emission lights from laser diodes 11B1 included in light source block 12B1 and transmit through transmissive areas 113b of split/combining mirror 110.

Thus, as illustrated in FIG. 6, light fluxes reflected by split/combining mirror 110 among emission lights from first light source unit 10A, and light fluxes whose emission lights are emitted from second light source unit 10B transmit through split/combining mirror 110 are alternately disposed. The alternate disposition is possible since, on split/combining mirror 110, reflection areas and transmissive areas are selectively formed to meet positions of a plurality of emission light fluxes from first light source unit 10A and second light source unit 10B.

Back to FIG. 3, the light fluxes of the emission lights from first light source unit 10A and second light source unit 10B are split into excitation light B1 for exciting phosphor wheel 20 and blue light B2 used as an image light and are combined by split/combining mirror 110.

A blue light obtained by combining the blue light reflected and split by split/combining mirror 110 and emitted from first light source unit 10A and the blue light from second light source unit 10B becomes excitation light B1. This excitation light B1 passes through an optical path (first optical path) including a route of lens 121, mirror 131, lens 122, diffuser 141, dichroic mirror 132, lens 123, lens 124 and phosphor wheel 20. Thus, excitation light B1 is applied to phosphor 22 of phosphor wheel 20 to emit yellow light Y1.

Meanwhile, part of blue lights from first light source unit 10A transmit through split/combining mirror 110, and become blue lights B2. This blue light B2 passes through an optical path (second optical path) including a route of lens 125, multiplexing reflection mirror 160, diffuser 142, lens 126 and dichroic mirror 132. Further, yellow light Y1 and blue light B2 are combined by dichroic mirror 132 (i.e., the first optical path and the second optical path are combined into one optical path), and are emitted as a while light.

Figure 7:
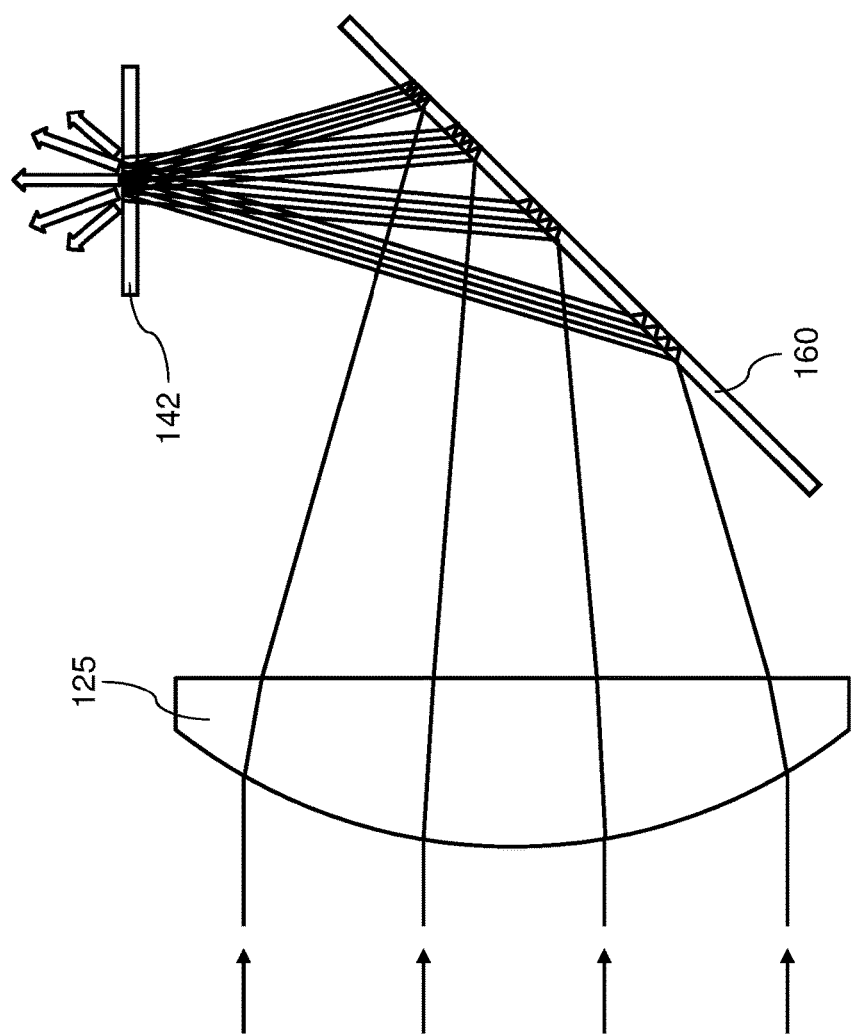
FIG. 7 is a view illustrating lights from a multiplexing reflection mirror according to the first exemplary embodiment.

In this case, a function of multiplexing reflection mirror 160 on the second optical path will be described with reference to FIGS. 7 and 8. As illustrated in FIG. 7, light fluxes condensed on the second optical path by lens 125 are split into a plurality of light fluxes by multiplexing reflection mirror 160, and are condensed on diffuser 142. That is, multiplexing reflection mirror 160 is disposed immediately before diffuser 142. Diffuser 142 enhances a uniformization effect of rod integrator 30 by diffusing incident lights having a discrete angular distribution. The diffuser is an example of a diffusing element.

Figure 8:
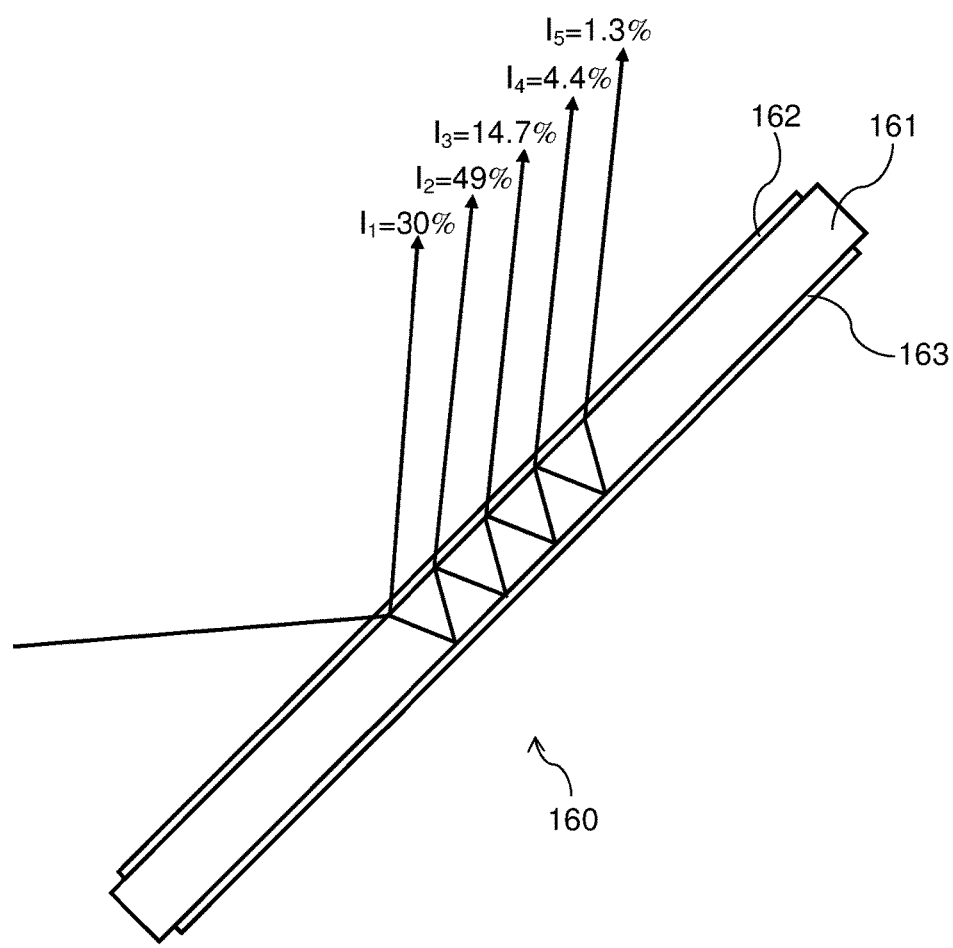
FIG. 8 is a view for explaining a function of the multiplexing reflection mirror according to the first exemplary embodiment.

In more detail, as illustrated in, FIG. 8, multiplexing reflection mirror 160 includes partial reflection coating 162 which is formed at a light incident side (first surface) of substrate 161 formed in a parallel flat shape, and total reflection coating 163 which is formed on a back surface (second surface) opposite to the first surface. Substrate 161 is, for example, a glass substrate which allows lights to transmit. Partial reflection coating 162 is a dielectric multilayer coating whose reflectance is 30% (transmittance is 70%), and this partial reflection coating is uniformly formed on an entire area of the first surface on which at lights are incident. Total reflection coating 163 is a dielectric multilayer coating from which a high reflectance close to 100% can be obtained, and the total reflection coating is uniformly formed on an entire area of the second surface on which at least lights are incident.

Thus, multiplexing reflection mirror 160 is disposed so as to incline toward an optical path of emission lights from the laser light sources such that the emission lights are incident from the first surface.

30% of incident lights (light intensity $I_1$ of a primary light=30%) on multiplexing reflection mirror 160 are reflected by partial reflection coating 162, and 70% of the incident lights are allowed to transmit. Next, 70% of the lights which have transmitted are reflected by total reflection coating 163 on the back surface. Again, when the lights reach partial reflection coating 162, 30% (21%) of 70% of lights are reflected, and 70% (light intensity $I_2$ of a secondary light=49%) of 70% of lights are allowed to transmit. Similarly, light intensity $I_3$ of a tertiary light=14.7%, light intensity $I_4$ of a quaternary light=4.4%, light intensity $I_5$ of a quinary light=1.3% and . . . are successively calculated.

As illustrated in FIG. 8, lights emitted by multiplexing reflection mirror 160 are split into light fluxes at the above light intensity ratio. Each split light flux is incident on a different position of diffuser 142.

In this regard, diffuser 142 has a function of diffusing each light flux of nearly parallel lights emitted from laser light sources and making a brightness distribution of a projected video image on a screen more uniform. However, simultaneously, a fine granular interference pattern is produced due to coherence of the laser light sources. In more detail, when a laser light having high coherence is incident on a fine random irregular surface on a diffusion surface of diffuser 142, a random interference pattern is produced. This interference pattern cannot be sufficiently made uniform via a uniformization optical system such as rod integrator 30, is left on a projected image light, and appears as unevenness in brightness of fine grains.

In addition, this interference pattern can be referred to as a speckle pattern produced in the optical system, but is distinguished from a speckle pattern (so-called scintillation) produced by an interference on the fine irregular surface of a screen on which image lights are projected. Even when the image lights incident on the screen are completely spatially uniform, the speckle pattern produced by an interference on the fine irregular surface of the screen appears as an interference pattern on retinas of eyes of a person. In the present exemplary embodiment, a main purpose is principally to reduce a speckle pattern produced in the optical system, and attention needs to be paid to an object to make uniform the brightness included in projected image lights reaching the screen.

Diffuser 142 includes the fine random irregular surface, and therefore produces an interference pattern which differs depending on a light flux incident position. Hence, multiplexing reflection mirror 160 splits light fluxes incident on the diffuser to produce a plurality of random interference patterns. As a result, a plurality of random patterns is superimposed, and unevenness in brightness of a projected video image is reduced. In addition, in this case, a light intensity ratio of each light flux to be split is desirably uniform. Further, an incident position or an incident angle of each split light flux with respect to the diffuser may differ a little, and is irrelevant to a difference between optical lengths of light fluxes. Hence, the difference between optical lengths of light fluxes may be a coherence length of a laser light or more or may be the coherence length or less. For example, as a thickness of multiplexing reflection mirror 160, inexpensive and general purpose thickness such as 0.7 mm or 1.1 mm used for a glass substrate may be selected.

In the first exemplary embodiment, the reflectance of partial reflection coating 162 is 30%, but is not limited to this. 30% of the reflectance of partial reflection coating 162 is an example of a predetermined reflectance. FIG. 9 is a table in which a relationship between the reflectance of partial reflection coating 162 and light intensity IN of each order is arranged systematically. A light intensity can be relatively equally split in a range of reflectances between 25% and 50%. Further, the light intensity can be more uniformly split desirably in a range of reflectances between 30% and 45%.

(Function and Effect)

In the first exemplary embodiment, light fluxes of a plurality of blue lights can be split into more subdivided light fluxes by multiplexing reflection mirror 160. Thus, it is possible to reduce unevenness in brightness and speckle noise in a projected video image. In addition, the light fluxes subdivided by multiplexing reflection mirror 160 are incident on diffuser 142. Consequently, it is possible to effectively reduce unevenness in brightness and speckle noise in combination with a light diffusing function of diffuser 142. Further, partial reflection coating 162 is formed to make a reflection coating having a predetermined reflectance uniform and, consequently, can be easily manufactured, thereby providing an effect of cost effectiveness.

Second Exemplary Embodiment

In the first exemplary embodiment, a light source apparatus which uses lights emitted from phosphor wheel 20, as image lights has been described. In the second exemplary embodiment, a case where a light source unit which emits red lights, a light source unit which emits green lights and a light source unit which emits blue lights are used for a light source apparatus will be described.

Figure 10:
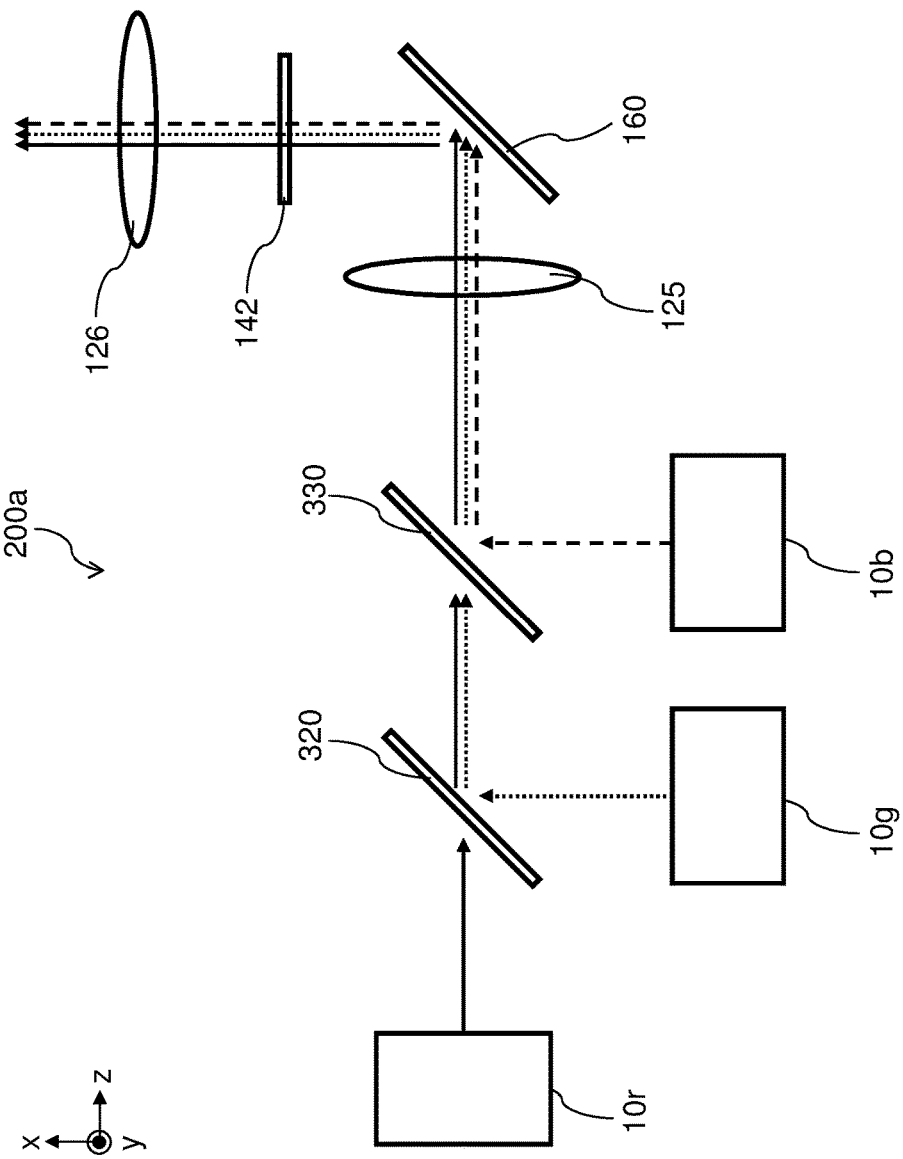
FIG. 10 is a view illustrating a light source apparatus according to a second exemplary embodiment.

Light source apparatus 200a according to the second exemplary embodiment will be described below with reference to FIG. 10. FIG. 10 is a view illustrating light source apparatus 200a according to the second exemplary embodiment, and the same components as components in the first exemplary embodiment will be assigned the same reference numerals and will not be described.

In the second exemplary embodiment, light source apparatus 200a mainly includes light source unit 10r, light source unit 10g, light source unit 10b, multiplexing reflection mirror 160, mirror 320 and mirror 330.

Light source unit 10r, light source unit 10g and light source unit 10b each include a plurality of laser diodes.

Emission lights from light source unit 10r are, for example, red lights of wavelengths between 630 nm and 650 nm.

Emission lights from light source unit 10g are, for example, green lights of wavelengths between 520 nm and 550 nm.

Emission lights from light source unit 10b are, for example, blue lights of wavelengths between 450 nm and 470 nm.

Mirror 320 is a dichroic mirror surface which allows red lights to transmit, and reflects green lights.

Mirror 330 is a dichroic mirror surface which allows red lights and green lights to transmit, and reflects blue lights.

In this regard, emission lights from light source unit 10r, light source unit 10g and light source unit 10b are combined as white lights by mirror 320 and mirror 330. Similar to the first exemplary embodiment, light fluxes are split into a plurality of light fluxes by multiplexing reflection mirror 160, and are incident on diffuser 142. The white lights diffused by diffuser 142 transmit through lens 126 and are emitted. The while lights having transmitted through lens 126 are incident on mirror 170 of the projection display apparatus.

According to the second exemplary embodiment, too, it is possible to provide the same effect as the effect of the first exemplary embodiment by using multiplexing reflection mirror 160 and the diffuser.

Other Exemplary Embodiments

The above exemplary embodiments have been described above as exemplary techniques disclosed in this application. However, the techniques according to the present disclosure are not limited to these, and are applicable to exemplary embodiments, too, which are changed, replaced, added or omitted. Further, it is also possible to provide new exemplary embodiments by combining components described in the above exemplary embodiments. Hereinafter, other exemplary embodiments will be described below.

Three DMDs 40R, 40G and 40B have been described as optical modulating elements in the above exemplary embodiments. However, the exemplary embodiments are not limited to this. The optical modulating element may be one DMD. Alternatively, the optical modulating element may be one liquid crystal panel or three liquid crystal panels (a red liquid crystal panel, a green liquid crystal panel and a blue liquid crystal panel). Each liquid crystal panel may be a transmissive liquid crystal panel or a reflection liquid crystal panel.

According to the first exemplary embodiment and the second exemplary embodiment, multiplexing reflection mirror 160 is disposed at a front stage on the optical path of diffuser 142. However, a disposition position is not limited to this. Multiplexing reflection mirror 160 can be replaced with other fold mirrors on the optical path. In the projection display apparatus according to the first exemplary embodiment (see FIG. 1), multiplexing reflection mirror 160 may also be used instead of, for example, mirror 133 and mirror 170. Alternatively, similar to multiplexing reflection mirror 160, in reflection areas 112 of split/combining mirror 110, partial reflection coating 162 and total reflection coating 163 may be formed.

In addition, the above exemplary embodiments are exemplary embodiments of the technique according to the present disclosure, and therefore can be variously changed, replaced, added and omitted in a range of the claims or a range equivalent to the claims.

The present disclosure is applicable to a projection display apparatus such as a projector.

What is claimed is:

1. A light source apparatus comprising:
   a laser light source;
   a phosphor wheel which includes phosphor formed in an annular shape;
   a split mirror configured to split an emission light from the laser light source into a first light path not passing through the phosphor wheel and a second light path passing through the phosphor wheel; and
   a multiplexing reflection mirror having a first surface on which a partial reflection coating having a predetermined reflectance is formed, and a second surface on which a total reflection coating is formed, the first surface and the second surface being opposite to each other and formed in a parallel flat shape,
   wherein the multiplexing reflection mirror is disposed on the first light path and disposed so as to incline toward an optical path of the emission light from the laser light source such that the emission light is incident on the first surface.

2. The light source apparatus according to claim 1, further comprising a diffusing element which diffuses the emission light from the laser light source.

3. The light source apparatus according to claim 2, wherein the multiplexing reflection mirror is disposed on an optical path, immediately before the diffusing element, of the emission light from the laser light source.

4. The light source apparatus according to claim 2, further comprising a light condenser configured to focus the emission light from the laser light source on the diffusing element,
   wherein the light condenser is disposed between the laser light source and the multiplexing mirror.

5. The light source apparatus according to claim 1, wherein the predetermined reflectance falls within a range from 25% to 50%.

6. A projection display apparatus comprising the light source apparatus according to claim 1.

7. The light source apparatus according to claim 1, wherein the second light path passes through blue light.

* * * * *